United States Patent
Moura et al.

(10) Patent No.: US 11,092,339 B2
(45) Date of Patent: Aug. 17, 2021

(54) APPARATUS AND METHOD FOR MITIGATING PARTICULATE ACCUMULATION ON A COMPONENT OF A GAS TURBINE

(71) Applicant: United Technologies Corporation, Farmington, CT (US)

(72) Inventors: Dennis M. Moura, South Windsor, CT (US); Carey Clum, East Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 140 days.

(21) Appl. No.: 16/239,879

(22) Filed: Jan. 4, 2019

(65) Prior Publication Data

US 2019/0219267 A1 Jul. 18, 2019

Related U.S. Application Data

(60) Provisional application No. 62/616,898, filed on Jan. 12, 2018.

(51) Int. Cl.
*F23R 3/08* (2006.01)
*F01D 25/12* (2006.01)
(Continued)

(52) U.S. Cl.
CPC ............... *F23R 3/08* (2013.01); *F01D 25/12* (2013.01); *F23R 3/002* (2013.01); *F23R 3/005* (2013.01);
(Continued)

(58) Field of Classification Search
CPC .. F23R 3/002; F23R 3/04; F23R 3/045; F23R 3/08; F23R 2900/00004;
(Continued)

(56) References Cited

U.S. PATENT DOCUMENTS

| 4,700,544 A | 10/1987 | Fucci |
| 9,534,783 B2 * | 1/2017 | Dierberger ............. F23R 3/002 |

(Continued)

FOREIGN PATENT DOCUMENTS

| EP | 0887612 A2 | 12/1998 |
| EP | 3306038 A1 | 4/2018 |

OTHER PUBLICATIONS

The Extended European Search Report for Application No. 19151675. 6-1006; dated Jun. 3, 2019; dated Jun. 20, 2019; 9 pages.

*Primary Examiner* — Arun Goyal
(74) *Attorney, Agent, or Firm* — Cantor Colburn LLP

(57) ABSTRACT

A gas turbine engine component assembly comprising: a first component having a first surface and a second surface opposite the first surface, wherein the first component includes a cooling hole extending from the second surface to the first surface; a second component having a first surface and a second surface, the first surface of the first component and the second surface of the second component defining a cooling channel therebetween; and a lateral flow injection device secured to first component, the lateral flow injection device fluidly connecting a flow path located proximate to the second surface of the first component to the cooling channel, the lateral flow injection device being configured to direct airflow from the airflow path into the cooling channel in about a lateral direction parallel to the second surface of the second component such that a cross flow is generated in the cooling channel.

16 Claims, 10 Drawing Sheets

(51) Int. Cl.
*F23R 3/00* (2006.01)
*F23R 3/06* (2006.01)
*F23R 3/04* (2006.01)

(52) U.S. Cl.
CPC ............... *F23R 3/045* (2013.01); *F23R 3/06* (2013.01); *F05D 2260/201* (2013.01); *F05D 2260/202* (2013.01); *F05D 2260/607* (2013.01); *F23R 2900/00004* (2013.01); *F23R 2900/03041* (2013.01); *F23R 2900/03043* (2013.01); *F23R 2900/03044* (2013.01)

(58) Field of Classification Search
CPC .. F23R 2900/00017; F23R 2900/03041; F23R 2900/03042; F23R 2900/03043; F23R 2900/03044; F23R 2900/03045; F05D 2240/35; F05D 2260/201–202; F05D 2260/607
See application file for complete search history.

(56) References Cited

U.S. PATENT DOCUMENTS

| | | | |
|---|---|---|---|
| 9,574,498 B2 * | 2/2017 | Fadde | F01D 9/023 |
| 9,644,843 B2 * | 5/2017 | Herborth | F23R 3/54 |
| 10,317,079 B2 * | 6/2019 | Kostka, Jr. | F23R 3/06 |
| 2010/0251723 A1 | 10/2010 | Chen et al. | |
| 2016/0209035 A1 | 7/2016 | Cramer | |
| 2017/0307217 A1 * | 10/2017 | Clemen | F23R 3/002 |

* cited by examiner

APPARATUS AND METHOD FOR MITIGATING PARTICULATE ACCUMULATION ON A COMPONENT OF A GAS TURBINE

CROSS-REFERENCE TO RELATED APPLICATIONS

This application claims the benefit of U.S. Provisional Application No. 62/616,898 filed Jan. 12, 2018, which is incorporated herein by reference in its entirety.

BACKGROUND

The subject matter disclosed herein generally relates to gas turbine engines and, more particularly, to a method and apparatus for mitigating particulate accumulation on cooling surfaces of components of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand and dirt.

SUMMARY

According to one embodiment, a gas turbine engine component assembly is provided. The gas turbine engine component assembly comprising: a first component having a first surface and a second surface opposite the first surface, wherein the first component includes a cooling hole extending from the second surface to the first surface through the first component; a second component having a first surface and a second surface, the first surface of the first component and the second surface of the second component defining a cooling channel therebetween in fluid communication with the cooling hole for cooling the second surface of the second component; and a lateral flow injection device secured to the first component, the lateral flow injection device fluidly connecting a flow path located proximate to the second surface of the first component to the cooling channel, the lateral flow injection device being configured to direct airflow from the airflow path into the cooling channel in about a lateral direction parallel to the second surface of the second component such that a cross flow is generated in the cooling channel.

In addition to one or more of the features described above, or as an alternative, further embodiments may include that the lateral flow injection device further comprises: a passageway body having a bend radius configured to direct airflow in about the lateral direction such that the cross flow is generated in the cooling channel.

In addition to one or more of the features described above, or as an alternative, further embodiments may include that the lateral flow injection device further comprises: a portion of the passageway body is located within the cooling hole.

In addition to one or more of the features described above, or as an alternative, further embodiments may include that the passageway body is at least one of scoop shaped and tubular shaped.

In addition to one or more of the features described above, or as an alternative, further embodiments may include that the passageway is formed in the passageway body and enclosed in the passageway body.

In addition to one or more of the features described above, or as an alternative, further embodiments may include that the passageway body and the cooling hole form the passageway.

In addition to one or more of the features described above, or as an alternative, further embodiments may include that the lateral flow injection device further comprises: a metering cap having a metering hole fluidly connecting an inlet of the passageway to the airflow path, wherein the metering hole has a cross-sectional area less than a cross-sectional area of the passageway.

In addition to one or more of the features described above, or as an alternative, further embodiments may include that the lateral flow injection device is fluidly connected to the airflow path through an inlet oriented in a direction about equal to a direction of the airflow path.

In addition to one or more of the features described above, or as an alternative, further embodiments may include that the lateral flow injection device is fluidly connected to the airflow path through an inlet oriented in a direction about perpendicular to a direction of the airflow path.

In addition to one or more of the features described above, or as an alternative, further embodiments may include that the lateral flow injection device further comprises: a particulate collection location located opposite the inlet and proximate a particulate separation turn configured to turn the airflow such that a particulate separates from the airflow and is directed into the particulate collection location.

According to another embodiment, a combustor for use in a gas turbine engine is provided. The combustor enclosing a combustion chamber having a combustion area. The combustor comprises: a combustion liner having an inner surface and an outer surface opposite the inner surface, wherein the combustion liner includes a primary aperture extending from the outer surface to the inner surface through the combustion liner; a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the combustion liner by an impingement cavity; and a lateral flow injection device secured to the combustion liner, the lateral flow injection device fluidly connecting a flow path located proximate to the outer surface of the combustion liner to the impingement cavity, the lateral flow injection device being configured to direct airflow from the airflow path into the impingement cavity in about a lateral direction parallel to the second surface of the heat shield panel such that a cross flow is generated in the impingement cavity.

In addition to one or more of the features described above, or as an alternative, further embodiments may include that the lateral flow injection device further comprises: a passageway body having a bend radius configured to direct airflow in about the lateral direction such that the cross flow is generated in the impingement cavity.

In addition to one or more of the features described above, or as an alternative, further embodiments may include that the lateral flow injection device further comprises: a portion of the passageway body is located within the preliminary orifice.

In addition to one or more of the features described above, or as an alternative, further embodiments may include that the passageway body is at least one of scoop shaped and tubular shaped.

In addition to one or more of the features described above, or as an alternative, further embodiments may include that the passageway is formed in the passageway body and enclosed in the passageway body.

In addition to one or more of the features described above, or as an alternative, further embodiments may include that the passageway body and the primary orifice form the passageway.

In addition to one or more of the features described above, or as an alternative, further embodiments may include that the lateral flow injection device further comprises: a metering cap having a metering hole fluidly connecting an inlet of the passageway to the airflow path, wherein the metering hole has a cross-sectional area less than a cross-sectional area of the passageway.

In addition to one or more of the features described above, or as an alternative, further embodiments may include that the lateral flow injection device is fluidly connected to the airflow path through an inlet oriented in a direction about equal to a direction of the airflow path.

In addition to one or more of the features described above, or as an alternative, further embodiments may include that the lateral flow injection device is fluidly connected to the airflow path through an inlet oriented in a direction about perpendicular to a direction of the airflow path.

In addition to one or more of the features described above, or as an alternative, further embodiments may include that the lateral flow injection device further comprises: a particulate collection location located opposite the inlet and proximate a particulate separation turn configured to turn the airflow such that a particulate separates from the airflow and is directed into the particulate collection location.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of panels of the combustor wall may be used to help cool the combustor. Convective cooling may be achieved by air that is channeled between the panels and a liner of the combustor. Impingement cooling may be a process of directing relatively cool air from a location exterior to the combustor toward a back or underside of the panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. The cooling air may contain particulates, which may build up on the heat shield panels overtime, thus reducing the cooling ability of the cooling air. Embodiments disclosed herein seek to address particulate adherence to the heat shield panels in order to maintain the cooling ability of the cooling air.

Figure 1:
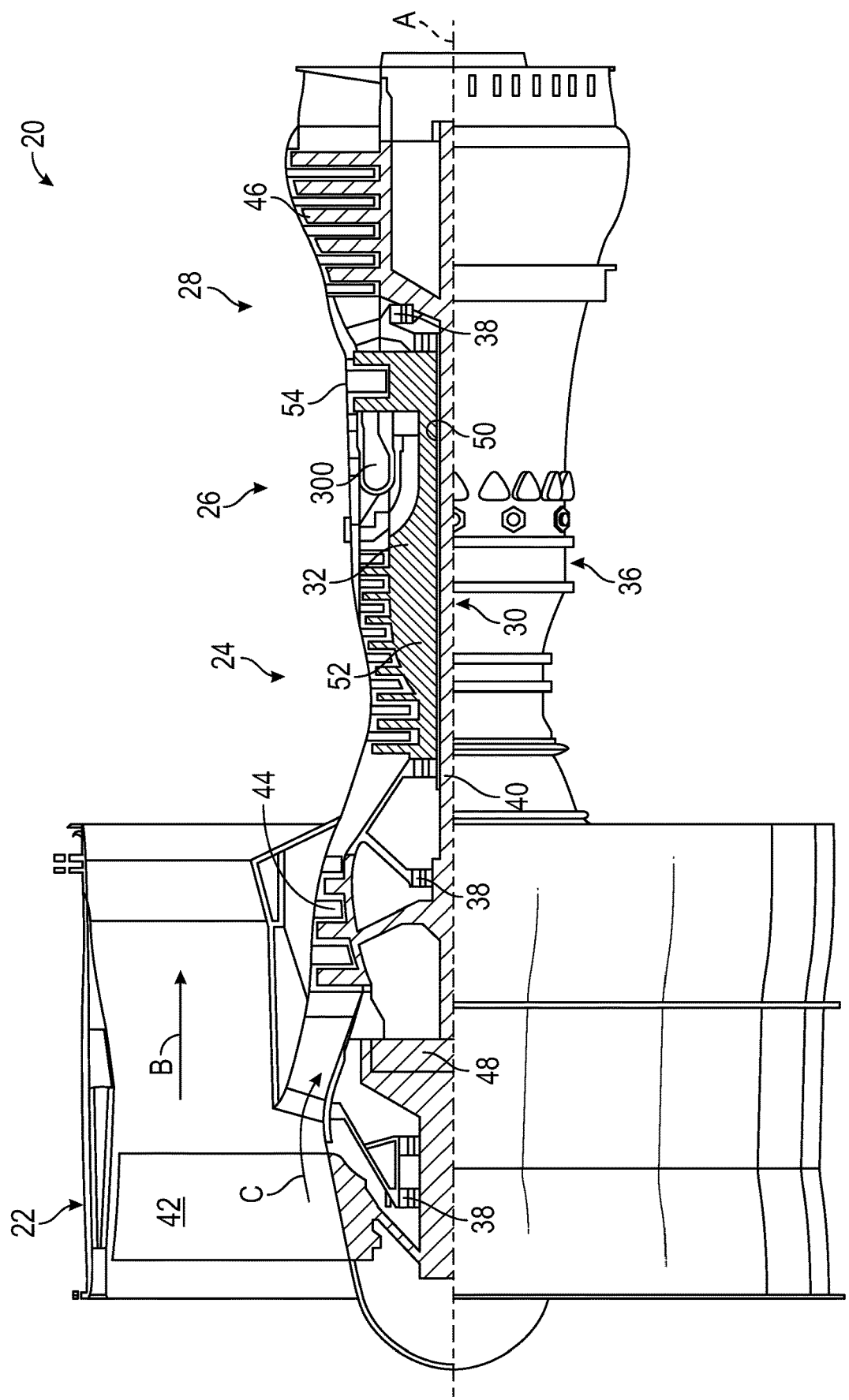
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
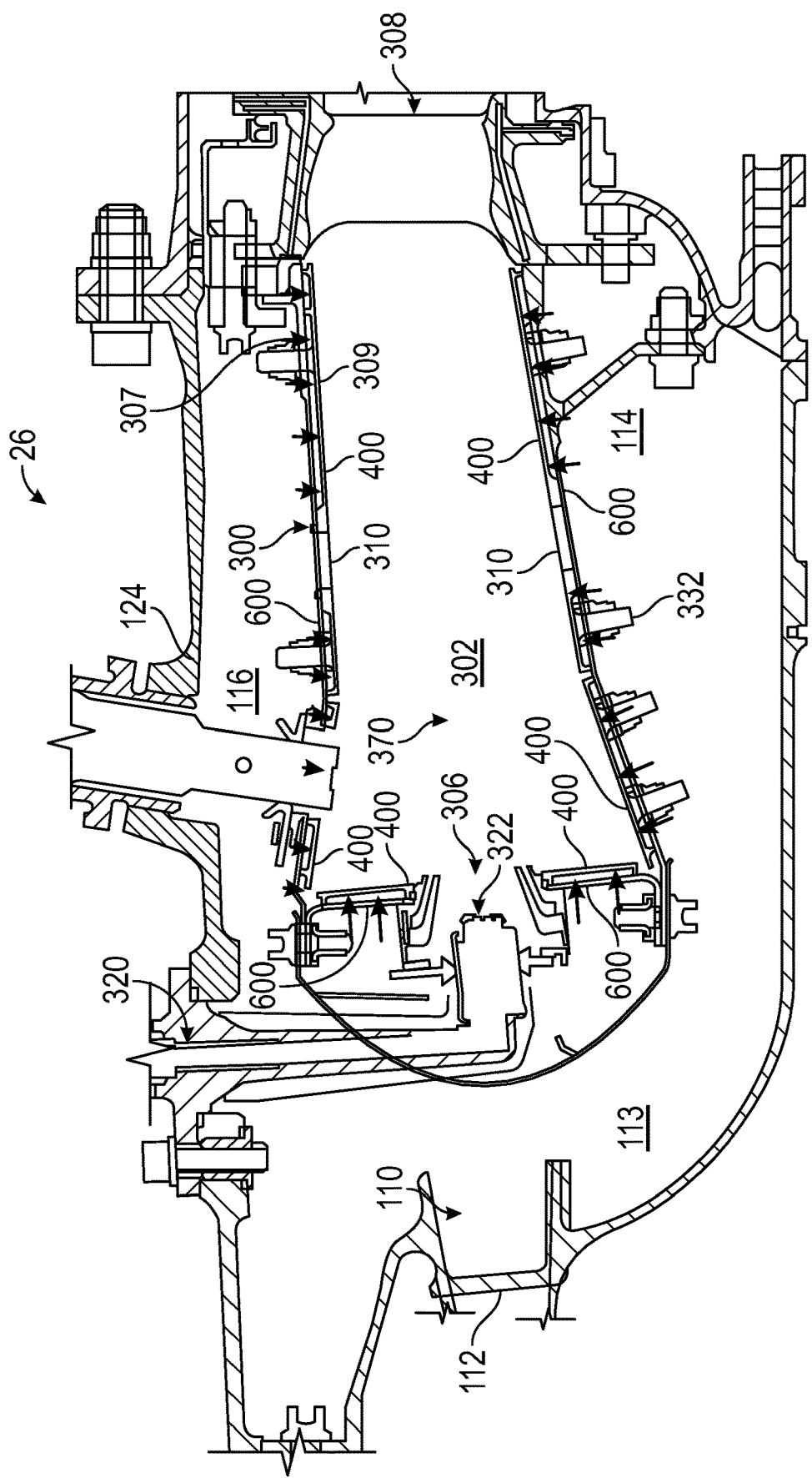
FIG. 2 is a cross-sectional illustration of a combustor, in accordance with an embodiment of the disclosure.

Referring now to FIG. 2 and with continued reference to FIG. 1, the combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more primary apertures 307 in the combustion liner 600 and one or more secondary apertures 309 in the heat shield panels 400. The primary apertures 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

Figure 3:
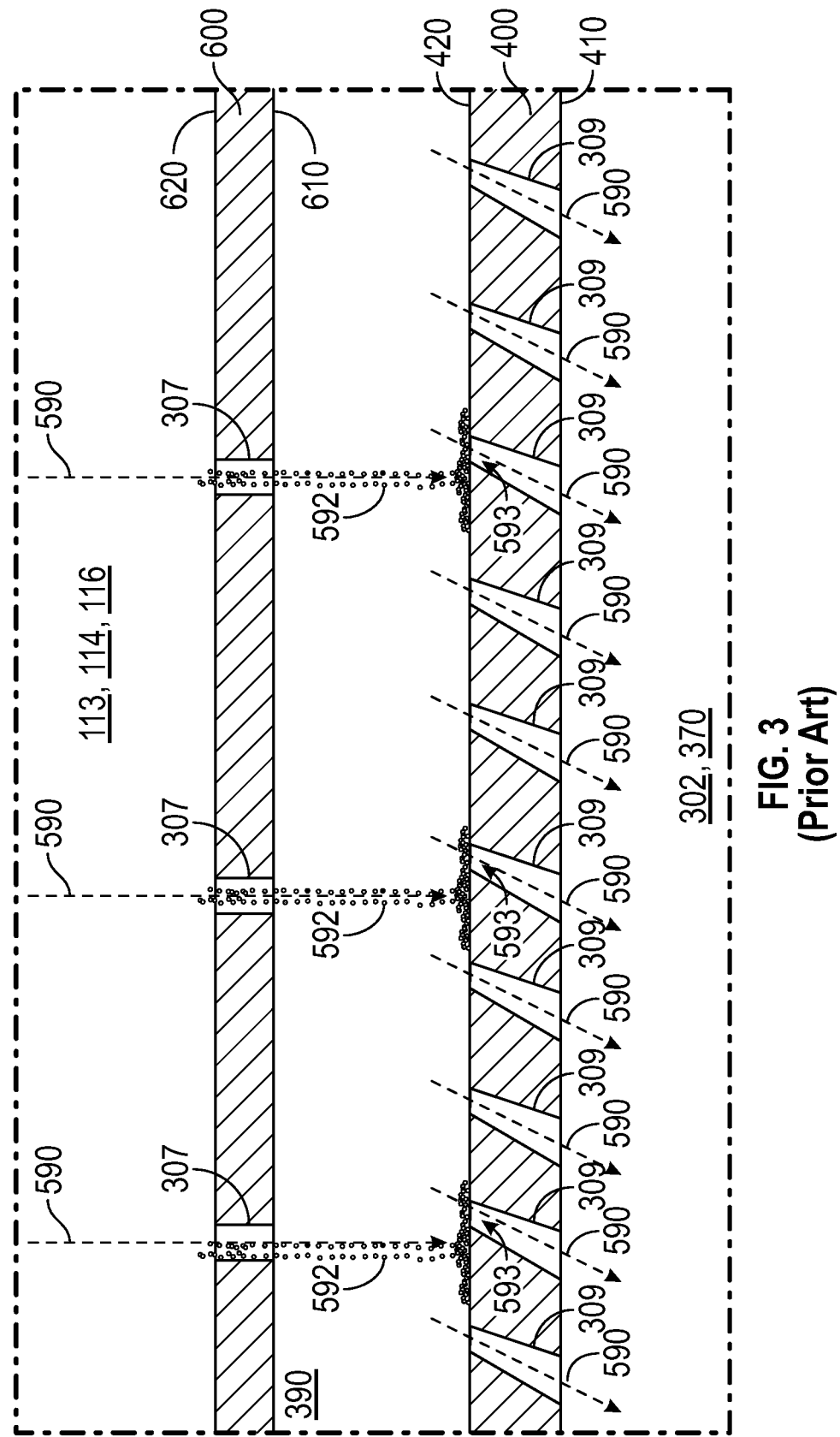
FIG. 3 is an enlarged cross-sectional illustration of a heat shield panel and combustion liner of a combustor, in accordance with an embodiment of the disclosure.

The combustor 300, as shown in FIG. 2, includes multiple heat shield panels 400 that are attached to the combustion liner 600 (See FIG. 3). The heat shield panels 400 may be arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partially enclose a combustion area 370 within the combustion chamber 302 of the combustor 300.

Referring now to FIGS. 3, 4A-4G, and 5 with continued reference to FIGS. 1 and 2. FIG. 3 illustrates a heat shield panel 400 and combustion liner 600 of a combustor 300 (see FIG. 1) of a gas turbine engine 20 (see FIG. 1). The heat shield panel 400 and the combustion liner 600 are in a facing spaced relationship. The heat shield panel 400 includes a first surface 410 oriented towards the combustion area 370 of the combustion chamber 302 and a second surface 420 first surface opposite the first surface 410 oriented towards the combustion liner 600. The combustion liner 600 having an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of primary apertures 307 configured to allow airflow 590 from the inner diameter branch 114 and the outer diameter branch 116 to enter an impingement cavity 390 in between the combustion liner 600 and the heat shield panel 400. Each of the primary apertures 307 extend from the outer surface 620 to the inner surface 610 through the combustion liner 600.

Each of the primary apertures 307 fluidly connects the impingement cavity 390 to at least one of the inner diameter branch 114 and the outer diameter branch 116. The heat shield panel 400 may include one or more secondary apertures 309 configured to allow airflow 590 from the impingement cavity 390 to the combustion area 370 of the combustion chamber 302.

Each of the secondary apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400 as it impinges on the second surface 420. As seen in FIG. 3, particulate 592 may accompany the airflow 590 flowing into the impingement cavity 390. Particulate 592 may include but is not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3. Particulate 592 collecting upon the second surface 420 of the heat shield panel 400 reduces the cooling efficiency of airflow 590 impinging upon the second surface 420 and thus may increase local temperatures of the heat shield panel 400 and the combustion liner 600. Particulate 592 collection upon the second surface 420 of the heat shield panel 400 may potentially create a blockage 593 to the secondary apertures 309 in the heat shield panels 400, thus reducing airflow 590 into the combustion area 370 of the combustion chamber 302. The blockage 593 may be a partial blockage or a full blockage.

Figure 4A:
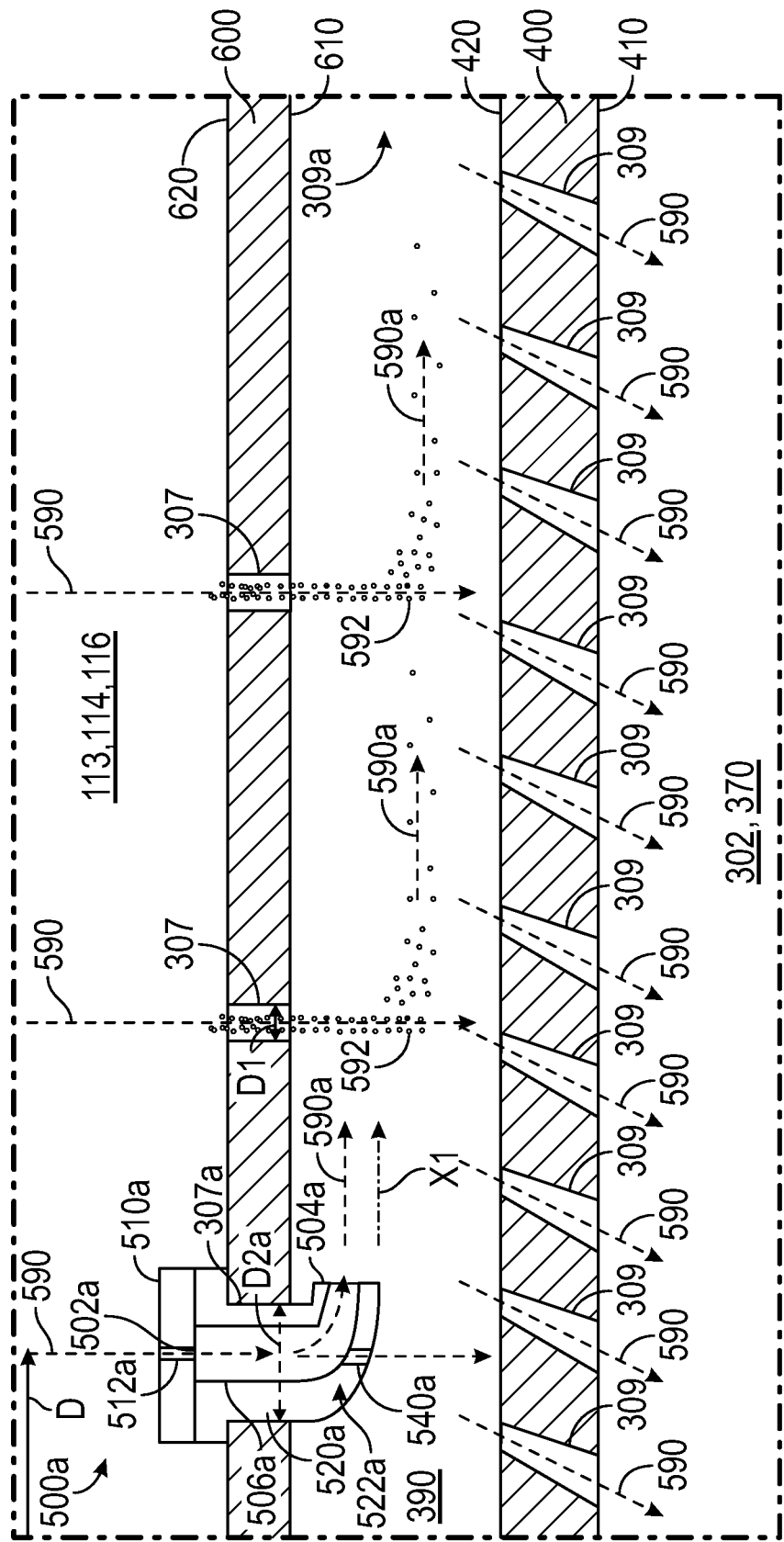
FIG. 4A is an illustration of a configuration of a lateral flow injection device for a combustor of a gas turbine engine, in accordance with an embodiment of the disclosure.

The combustion liner 600 may include a lateral flow injection device 500a-f configured to direct airflow from an airflow path D into the impingement cavity in about a lateral direction X1 such that a cross flow 590a is generated in the impingement cavity 590. The lateral direction X1 may be parallel relative to the second surface 420 of the heat shield panel 400. Advantageously, the addition of a lateral flow injection device 500a-g to the combustion liner 600 generates a lateral airflow 590 thus promoting the movement of particulate 592 through the impingement cavity 390, thus reducing the amount of particulate 592 collecting on the second surface 420 of the heat shield panel 400, as seen in FIG. 4A. Also advantageously, if the impingement cavity 390 includes an exit 390a, the addition of a lateral flow injection device 500a-g to the combustion liner 600 helps to generate and/or adjust a lateral airflow 590a, which promotes the movement of particulate 592 through the impingement cavity 390 and towards the exit 390a of the impingement cavity 390. Although only one is illustration in FIGS. 4A-4G, the combustion liner 600 may include one or more lateral flow injection devices 500A-G. The lateral flow injection device 500A-G is secured to the combustion liner 600. The lateral flow injection device 500 may be embedded in the combustion liner 600, as seen in FIGS. 4A-4G. The lateral flow injection device 500 is configured to allow airflow 590 in an airflow path D to enter through an inlet 502a-g proximate the outer surface 620, convey the airflow 590 though through a passageway 506a-g, and expel the airflow 590 through an outlet 504a-g into the impingement cavity 390 in about a lateral direction. The passageway 506a-g fluidly connects the shroud chamber 113, the inner diameter branch 114, and the outer diameter branch 116 to the impingement cavity 390. The passageway 506a-g is fluidly connected to the shroud chamber 113, the inner diameter branch 114, and the outer diameter branch 116 through the inlet 502a-g. The passageway 506a-g is fluidly connected to impingement cavity 390 through the outlet 504a-g. The lateral flow injection device 500a-g may be configured differently as shown in FIGS. 4A-4G.

FIG. 4A illustrates a first configuration of a lateral flow injection device 500a. The first configuration of the lateral flow injection device 500a includes a passageway body 520a having a bend radius 522a configured to direct airflow 592 in about a lateral direction X1 to generate a cross flow 590a. The passageway body 520a may be tubular shaped, as shown in FIG. 4A. The passageway 506a may be formed in the passageway body 520a and enclosed in the passageway body 520a. A portion of the passageway body 520a may be inserted into a dedicated primary orifice 307a. The dedicated primary orifice 307a may have a diameter D2a that is larger than a diameter D1 of other primary orifices 307. The diameter D2a of the dedicated primary office 307a may be larger than the diameter D1 of other primary orifices 307 in order to accommodate the passageway body 520a.

The first configuration of the lateral flow injection device 500a also includes a metering cap 510a configured to regulate the amount of airflow 590 into the passageway 506a. As illustrated in FIG. 4A, the metering cap 510a and the passageway body 520a may be formed from separate pieces. The metering cap 510a may be operably attached to the passageway body 520a. The metering cap 510a may include a metering hole 512a fluidly connecting the inlet 502a to the shroud chamber 113, the inner diameter branch 114, and the outer diameter branch 116. The metering hole 512a of the metering cap 510a may have a smaller cross-sectional area than a cross-sectional area of passageway 506a. The smaller cross-sectional area of the metering hole 512a in comparison to the cross-sectional area of the passageway 506a allows the metering hole 512a to regulate the amount of airflow 590 into the passageway 506a.

The orientation of the metering hole 512a may be non-parallel with the airflow path D. The orientation of the metering hole 512a may be about perpendicular to airflow path D, as shown in FIG. 4A. As illustrated in FIG. 4A, the passageway 506a may be circular in shape but it is understood that the passageway 506a may be shaped differently. Also, as illustrated in FIG. 4A, the metering hole 512a may be circular in shape but it is understood that the metering hole 512a may be shaped differently. The first configuration of the lateral flow injection device 500a may also include an impingement hole 540a configured to direct local impingement of airflow 590 on to the second surface 420 of the heat shield panel 400.

Figure 4D:
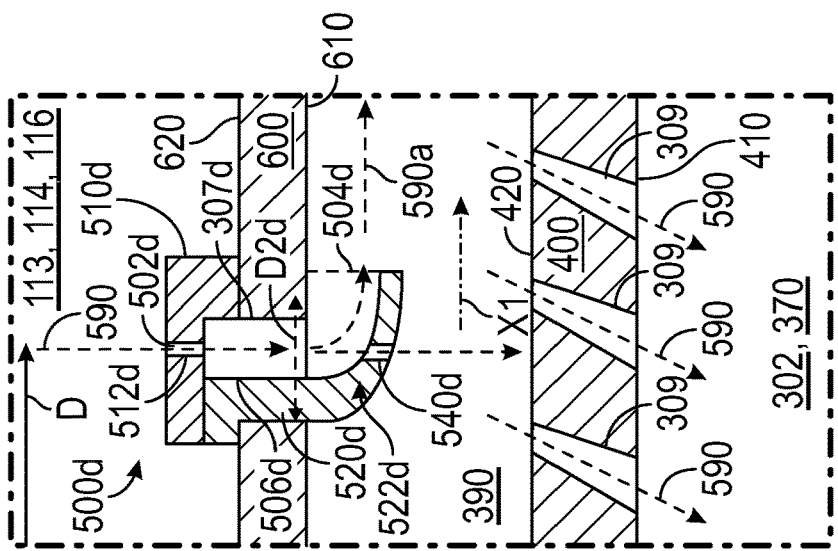
FIG. 4D is an illustration of a configuration of a lateral flow injection device for a combustor of a gas turbine engine, in accordance with an embodiment of the disclosure.
Figure 4C:
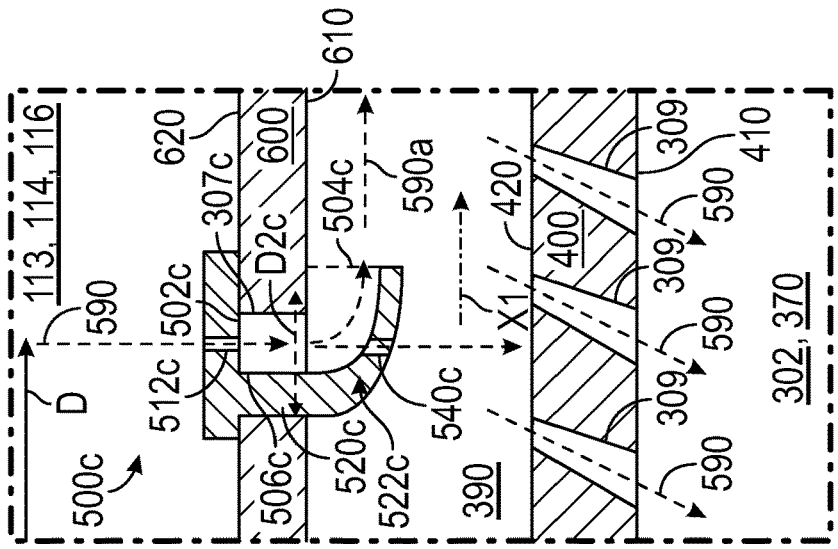
FIG. 4C is an illustration of a configuration of a lateral flow injection device for a combustor of a gas turbine engine, in accordance with an embodiment of the disclosure.
Figure 4B:
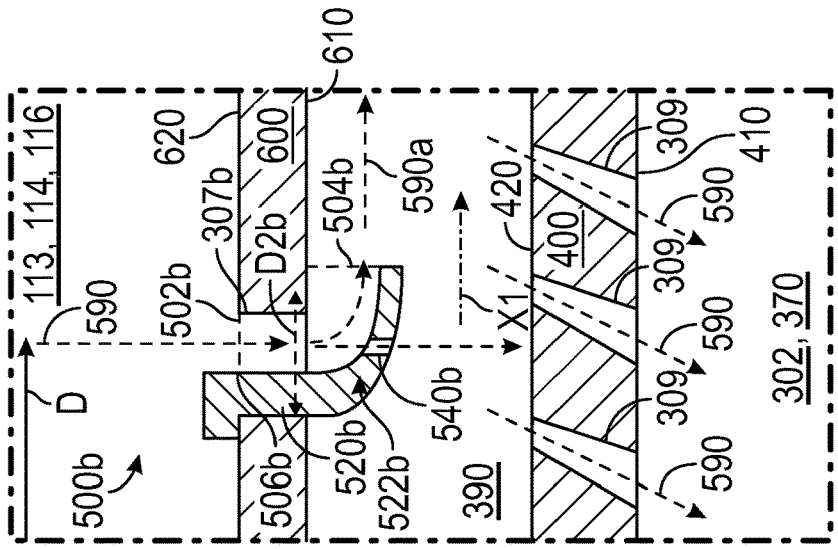
FIG. 4B is an illustration of a configuration of a lateral flow injection device for a combustor of a gas turbine engine, in accordance with an embodiment of the disclosure.

FIG. 4B illustrates a second configuration of a lateral flow injection device 500b. The second configuration of the lateral flow injection device 500b includes a passageway body 520b having a bend radius 522b configured to direct airflow 592 in about a lateral direction X1 to generate a cross flow 590a. The passageway body 520b may be scoop shaped (i.e. partial tube shape), as shown in FIG. 4B. The passageway 506b may be formed by the passageway body 520b and a dedicated primary orifice 307b in which the passageway body 520b is located, described further below. The passageway 506b may be partially enclosed in the passageway body 520b. A portion of the passageway body 520b may be inserted into the dedicated primary orifice 307b. The dedicated primary orifice 307b may have a diameter D2b that is larger than a diameter D1 of other primary orifices 307. The diameter D2b of the dedicated primary office 307b may be larger than the diameter D1 of other primary orifices 307 in order to accommodate the passageway body 520b.

The inlet 205b fluidly connects the passageway to the shroud chamber 113, the inner diameter branch 114, and the outer diameter branch 116. The orientation of the inlet 502b may be non-parallel with the airflow path D. The orientation of the inlet 502b may be about perpendicular to airflow path D, as shown in FIG. 4B. As illustrated in FIG. 4B, the passageway 506b may be circular in shape but it is understood that the passageway 506b may be shaped differently. The second configuration of the lateral flow injection device 500b may also include an impingement hole 540b configured to direct local impingement of airflow 590 on to the second surface 420 of the heat shield panel 400.

FIG. 4c illustrates a third configuration of a lateral flow injection device 500c. The third configuration of the lateral flow injection device 500c includes a passageway body 520c having a bend radius 522c configured to direct airflow 592 in about a lateral direction X1 to generate a cross flow 590a. The passageway body 520c may be scoop shaped, as shown in FIG. 4C. The passageway 506c may be formed by the passageway body 520c and a dedicated primary orifice 307c in which the passageway body 520c is located, described further below. The passageway 506c may be partially enclosed in the passageway body 520c. A portion of the passageway body 520c may be inserted into a dedicated primary orifice 307c. The dedicated primary orifice 307c may have a diameter D2c that is larger than a diameter D1 of other primary orifices 307. The diameter D2c of the dedicated primary office 307c may be larger than the diameter D1 of other primary orifices 307 in order to accommodate the passageway body 520c.

The third configuration of the lateral flow injection device 500c also includes a metering cap 510c configured to regulate the amount of airflow 590 into the passageway 506c. As illustrated in FIG. 4C, the metering cap 510c and the passageway body 520c may be formed from a single piece of material as opposed to separate pieces that are attached (see FIG. 4A). The metering cap 510c may include a metering hole 512c fluidly connecting the inlet 502c to the shroud chamber 113, the inner diameter branch 114, and the outer diameter branch 116. The metering hole 512c of the metering cap 510c may have a smaller cross-sectional area than a cross-sectional area of passageway 506c. The smaller cross-sectional area of the metering hole 512c in comparison to the cross-sectional area of the passageway 506c allows the metering hole 512c to regulate the amount of airflow 590 into the passageway 506c.

The orientation of the metering hole 512c may be non-parallel with the airflow path D. The orientation of the metering hole 512c may be about perpendicular to airflow path D, as shown in FIG. 4C. As illustrated in FIG. 4C, the passageway 506c may be circular in shape but it is understood that the passageway 506c may be shaped differently. Also, as illustrated in FIG. 4C, the metering hole 512c may be circular in shape but it is understood that the metering hole 512c may be shaped differently. The third configuration of the lateral flow injection device 500c may also include an impingement hole 540c configured to direct local impingement of airflow 590 on to the second surface 420 of the heat shield panel 400.

FIG. 4D illustrates a fourth configuration of a lateral flow injection device 500d. The fourth configuration of the lateral flow injection device 500d includes a passageway body 520d having a bend radius 522d configured to direct airflow 592 in about a lateral direction X1 to generate a cross flow 590a. The passageway body 520d may be scoop shaped, as shown in FIG. 4D. The passageway 506d may be formed by the passageway body 520d and a dedicated primary orifice 307d in which the passageway body 520d is located, described further below. The passageway 506d may be partially enclosed in the passageway body 520d. A portion of the passageway body 520d may be inserted into a dedicated primary orifice 307d. The dedicated primary orifice 307d may have a diameter D2d that is larger than a diameter D1 of other primary orifices 307. The diameter D2d of the dedicated primary office 307d may be larger than the diameter D1 of other primary orifices 307 in order to accommodate the passageway body 520d.

The fourth configuration of the lateral flow injection device 500d also includes a metering cap 510d configured to regulate the amount of airflow 590 into the passageway 506d. As illustrated in FIG. 4D, the metering cap 510d and the passageway body 520d may be formed from separate pieces. The metering cap 510d may be operably attached to the passageway body 520d. The metering cap 510d may include a metering hole 512d fluidly connecting the inlet 502d to the shroud chamber 113, the inner diameter branch 114, and the outer diameter branch 116. The metering hole 512d of the metering cap 510d may have a smaller cross-sectional area than a cross-sectional area of passageway 506d. The smaller cross-sectional area of the metering hole 512d in comparison to the cross-sectional area of the passageway 506d allows the metering hole 512d to regulate the amount of airflow 590 into the passageway 506d. The metering cap 510d may be interchangeable with additional metering caps 510d. Each additional metering cap 510d may have a metering hole 512 with a different cross-sectional area size, thus affecting differently how the airflow 590 is regulated into the passageway 506d. For example, a first metering cap 510d having a metering hole 512 with a larger cross-sectional area than the metering hole 512 of a second metering cap 510d may allow more airflow 590 into the passageway 560d.

The orientation of the metering hole 512d may be non-parallel with the airflow path D. The orientation of the metering hole 512d may be about perpendicular to airflow path D, as shown in FIG. 4D. As illustrated in FIG. 4D, the passageway 506d may be circular in shape but it is understood that the passageway 506d may be shaped differently. Also, as illustrated in FIG. 4D, the metering hole 512d may be circular in shape but it is understood that the metering hole 512d may be shaped differently. The fourth configuration of the lateral flow injection device 500d may also include an impingement hole 540d configured to direct local impingement of airflow 590 on to the second surface 420 of the heat shield panel 400.

Figure 4G:
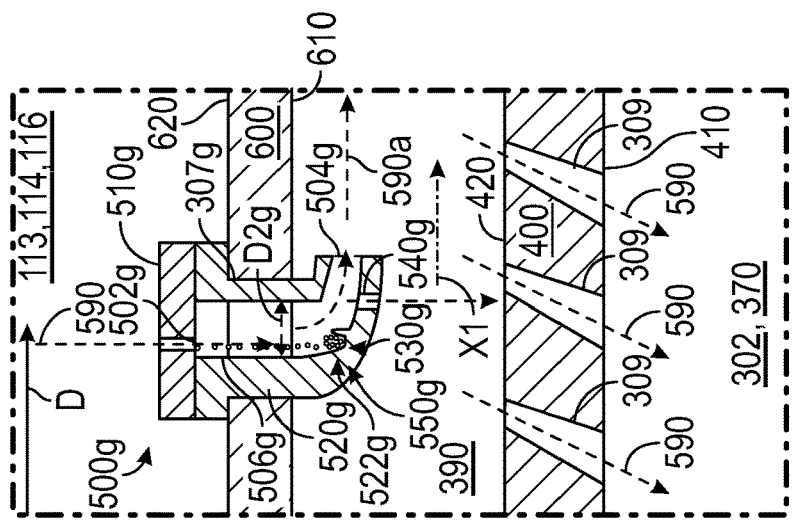
FIG. 4G is an illustration of a configuration of a lateral flow injection device for a combustor of a gas turbine engine, in accordance with an embodiment of the disclosure.
Figure 4F:
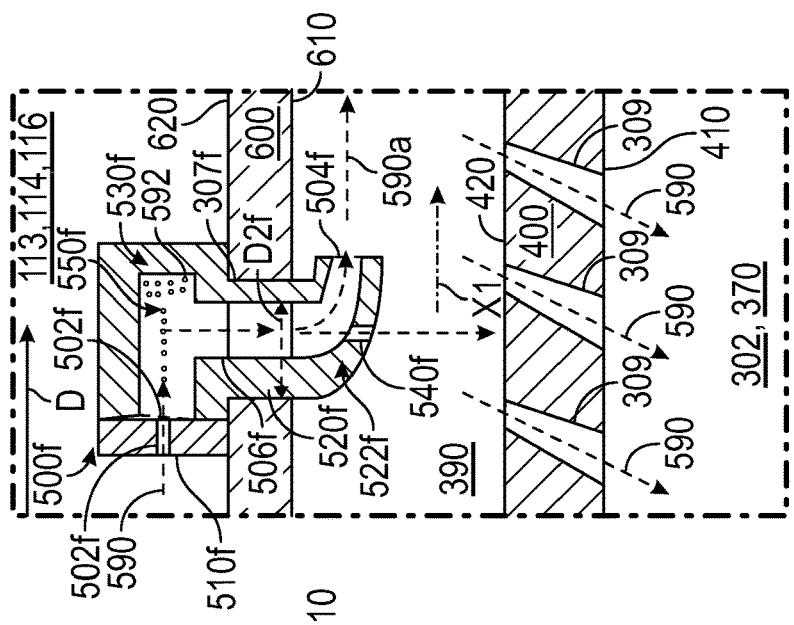
FIG. 4F is an illustration of a configuration of a lateral flow injection device for a combustor of a gas turbine engine, in accordance with an embodiment of the disclosure.
Figure 4E:
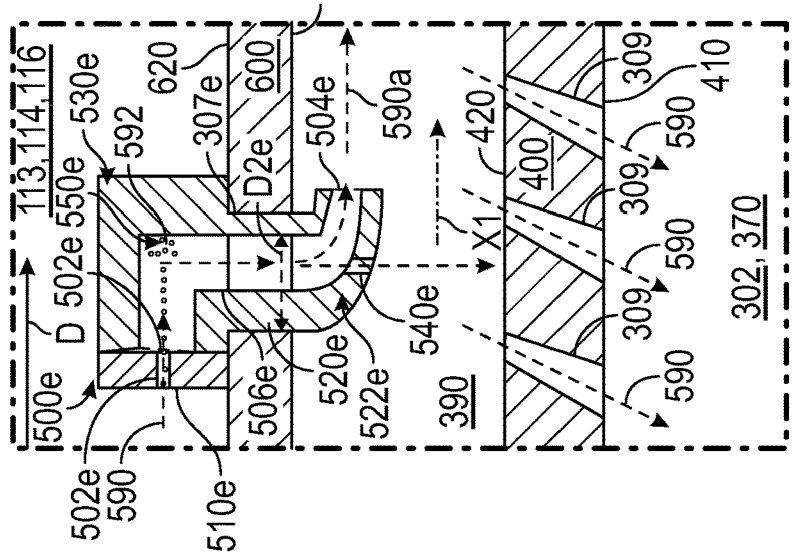
FIG. 4E is an illustration of a configuration of a lateral flow injection device for a combustor of a gas turbine engine, in accordance with an embodiment of the disclosure.

FIG. 4E illustrates a fifth configuration of a lateral flow injection device 500e. The fifth configuration of the lateral flow injection device 500e includes a passageway body 520e having a bend radius 522e configured to direct airflow 592 in about a lateral direction X1 to generate a cross flow 590a. The passageway body 520e may be tubular shaped, as shown in FIG. 4E. The passageway 506e may be formed in the passageway body 520e and enclosed in the passageway body 520e. A portion of the passageway body 520e may be inserted into a dedicated primary orifice 307e. The dedicated primary orifice 307e may have a diameter D2e that is larger than a diameter D1 of other primary orifices 307. The diameter D2e of the dedicated primary office 307e may be larger than the diameter D1 of other primary orifices 307 in order to accommodate the passageway body 520e.

The fifth configuration of the lateral flow injection device 500e also includes a metering cap 510e configured to regulate the amount of airflow 590 into the passageway 506e. As illustrated in FIG. 4E, the metering cap 510e and the passageway body 520e may be formed from separate pieces. Alternatively, the metering cap 510e and the passageway body 520e may be formed from a single piece. The metering cap 510e may be operably attached to the passageway body 520e. The metering cap 510e may include a metering hole 512e fluidly connecting the inlet 502e to the shroud chamber 113, the inner diameter branch 114, and the outer diameter branch 116. The metering hole 512e of the metering cap 510e may have a smaller cross-sectional area than a cross-sectional area of passageway 506e. The smaller cross-sectional area of the metering hole 512e in comparison to the cross-sectional area of the passageway 506e allows the metering hole 512e to regulate the amount of airflow 590 into the passageway 506e.

The orientation of the metering hole 512e may be about parallel with the airflow path D, as shown in FIG. 4E. As illustrated in FIG. 4E, the passageway 506e may be circular in shape but it is understood that the passageway 506e may be shaped differently. Also, as illustrated in FIG. 4E, the metering hole 512e may be circular in shape but it is understood that the metering hole 512e may be shaped differently. A particulate collection location 530e may be located opposite the inlet 502e and proximate a particulate separation 550e turn in the passageway 506e. The particulate collection location 530e in FIG. 4E is configured as a back stop. The particulate separation turn 550e is configured to turn airflow 590 a selected angle such that the airflow 590 will continue through the passageway 506e but momentum of the particulate 592 will carry the particulate 592 into the collection location 530e. The particulate collection location 530e in FIG. 4E is configured as a well. The selected angle may be equal to about 90°. Advantageously, the separation turn 550 may help reduce entry of particulate 592 into the impingement gap 390. The fifth configuration of the lateral flow injection device 500e may also include an impingement hole 540e configured to direct local impingement of airflow 590 on to the second surface 420 of the heat shield panel 400.

FIG. 4F illustrates a sixth configuration of a lateral flow injection device 500f. The sixth configuration of the lateral flow injection device 500f includes a passageway body 520f having a bend radius 522f configured to direct airflow 592 in about a lateral direction X1 to generate a cross flow 590a. The passageway body 520f may be tubular shaped, as shown in FIG. 4F. The passageway 506f may be formed in the passageway body 520f and enclosed in the passageway body 520f. A portion of the passageway body 520f may be inserted into a dedicated primary orifice 307f. The dedicated primary orifice 307f may have a diameter D2f that is larger than a diameter D1 of other primary orifices 307. The diameter D2f of the dedicated primary office 307f may be larger than the diameter D1 of other primary orifices 307 in order to accommodate the passageway body 520f.

The sixth configuration of the lateral flow injection device 500f also includes a metering cap 510f configured to regulate the amount of airflow 590 into the passageway 506f. As illustrated in FIG. 4F, the metering cap 510f and the passageway body 520f may be formed from separate pieces. Alternatively, the metering cap 510f and the passageway body 520f may be formed from a single piece. The metering cap 510f may be operably attached to the passageway body 520f. The metering cap 510f may include a metering hole 512f fluidly connecting the inlet 502f to the shroud chamber 113, the inner diameter branch 114, and the outer diameter branch 116. The metering hole 512f of the metering cap 510f may have a smaller cross-sectional area than a cross-sectional area of passageway 506f. The smaller cross-sectional area of the metering hole 512f in comparison to the cross-sectional area of the passageway 506f allows the metering hole 512f to regulate the amount of airflow 590 into the passageway 506f.

The orientation of the metering hole 512f may be about parallel with the airflow path D, as shown in FIG. 4F. As illustrated in FIG. 4F, the passageway 506f may be circular in shape but it is understood that the passageway 506f may be shaped differently. Also, as illustrated in FIG. 4F, the metering hole 512f may be circular in shape but it is understood that the metering hole 512f may be shaped differently. A particulate collection location 530f may be located opposite the inlet 502f and proximate a particulate separation 550f turn in the passageway 506f. The particulate collection location 530f in FIG. 4F is configured as a well. The particulate separation turn 550f is configured to turn airflow 590 at a selected angle such that the airflow 590 will continue through the passageway 506f but momentum of the particulate 592 will carry the particulate 592 into the collection location 530f. The selected angle may be equal to about 90°. Advantageously, the separation turn 550 may help reduce entry of particulate 592 into the impingement gap 390. The sixth configuration of the lateral flow injection device 500f may also include an impingement hole 540f configured to direct local impingement of airflow 590 on to the second surface 420 of the heat shield panel 400.

FIG. 4G illustrates a seventh configuration of a lateral flow injection device 500g. The seventh configuration of the lateral flow injection device 500g includes a passageway body 520g having a bend radius 522g configured to direct airflow 592 in about a lateral direction X1 to generate a cross flow 590a. The passageway body 520g may be tubular shaped, as shown in FIG. 4G. The passageway 506g may be formed in the passageway body 520g and enclosed in the passageway body 520g. A portion of the passageway body 520g may be inserted into a dedicated primary orifice 307g. The dedicated primary orifice 307g may have a diameter D2g that is larger than a diameter D1 of other primary orifices 307. The diameter D2g of the dedicated primary office 307g may be larger than the diameter D1 of other primary orifices 307 in order to accommodate the passageway body 520g.

The seventh configuration of the lateral flow injection device 500g also includes a metering cap 510g configured to regulate the amount of airflow 590 into the passageway 506g. As illustrated in FIG. 4G, the metering cap 510g and the passageway body 520g may be formed from separate pieces. The metering cap 510g may be operably attached to the passageway body 520g. The metering cap 510g may include a metering hole 512g fluidly connecting the inlet 502g to the shroud chamber 113, the inner diameter branch 114, and the outer diameter branch 116. The metering hole 512g of the metering cap 510g may have a smaller cross-sectional area than a cross-sectional area of passageway 506g. The smaller cross-sectional area of the metering hole 512g in comparison to the cross-sectional area of the passageway 506g allows the metering hole 512g to regulate the amount of airflow 590 into the passageway 506g.

The orientation of the metering hole 512g may be non-parallel with the airflow path D. The orientation of the metering hole 512g may be about perpendicular to airflow path D, as shown in FIG. 4G. As illustrated in FIG. 4G, the passageway 506g may be circular in shape but it is understood that the passageway 506g may be shaped differently. Also, as illustrated in FIG. 4G, the metering hole 512g may be circular in shape but it is understood that the metering hole 512g may be shaped differently. A particulate collection location 530g may be located opposite the inlet 502g and proximate a particulate separation 550g turn in the passageway 506g. The particulate collection location 530g in FIG. 4G is configured as a well. The particulate separation turn 550g is configured to turn airflow 590 a selected angle such that the airflow 590 will continue through the passageway 506g but momentum of the particulate 592 will carry the particulate 592 into the collection location 530g. The selected angle may be equal to about 90°. Advantageously, the separation turn 550 may help reduce entry of particulate 592 into the impingement gap 390. The separation turn 550g may be located proximate the bend radius 522g, as seen in FIG. 4G. The seventh configuration of the lateral flow injection device 500g may also include an impingement hole 540g configured to direct local impingement of airflow 590 on to the second surface 420 of the heat shield panel 400.

It is understood that the configurations of lateral flow injection device 500a-g are shown in FIGS. 4A-4F for illustrated purposes and are not intended to be limiting thus embodiments shown in each configuration may be mixed and/or combined among the different configurations.

Figure 5:
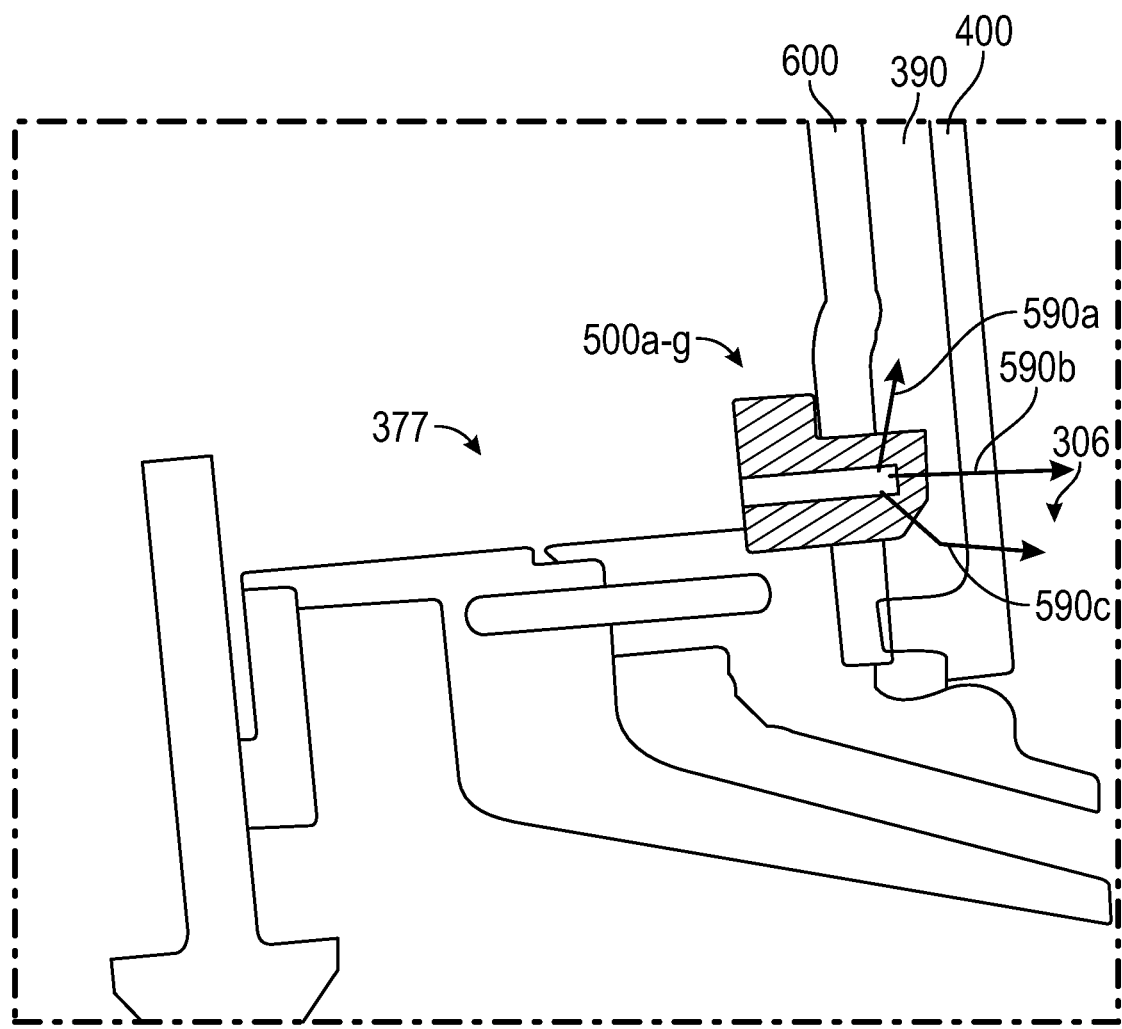
FIG. 5 is an illustration of location of a lateral flow injection device for a combustor of a gas turbine engine, in accordance with an embodiment of the disclosure.

As illustrated in FIG. 5, the lateral flow injection device 500a-g may be attached to various locations of the combustor 300 including but not limited to proximate the combustor de-swirler 377 proximate the inlet 306 of the combustor 300. The lateral flow injection device 500a-g also direct various impingement airflows 590b, 590c onto the heat shield panel 400 in addition to generating a lateral airflow 590a into the impingement cavity 390. The impingement airflows 590b, 590c may include a normal impingement airflow 590b and an angled impingement airflow 590c as seen in FIG. 5. The lateral flow injection device 500a-g may also be configured to direct the lateral flow 590a at an angle relative to the heat shield panel 400. The angle relative to the heat shield panel 400 may be up to 30°.

Figure 6A:
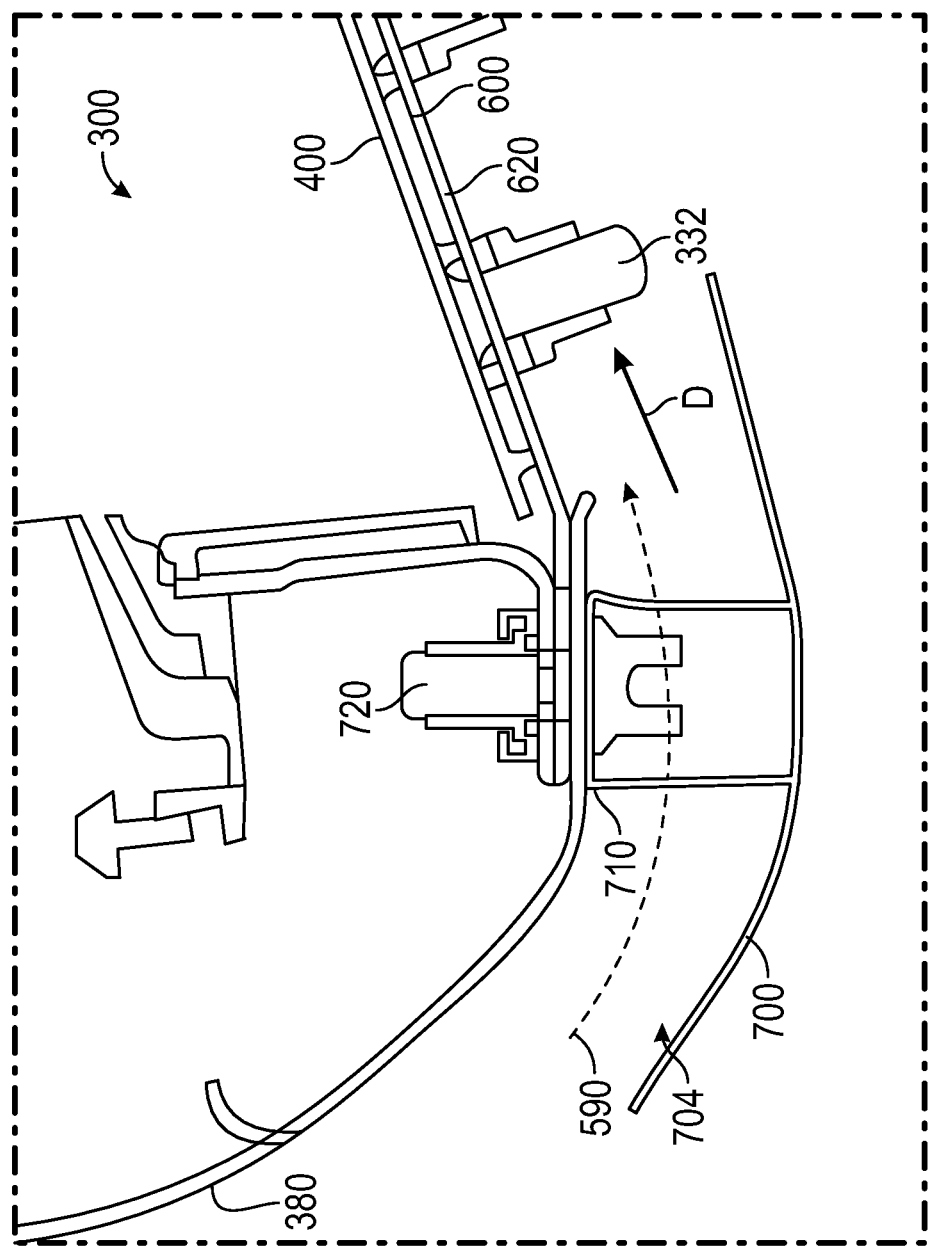
FIG. 6A is an enlarged cross-sectional illustration of the combustor of FIG. 2 having a fairing attached to the combustor, in accordance with an embodiment of the disclosure.
Figure 6B:
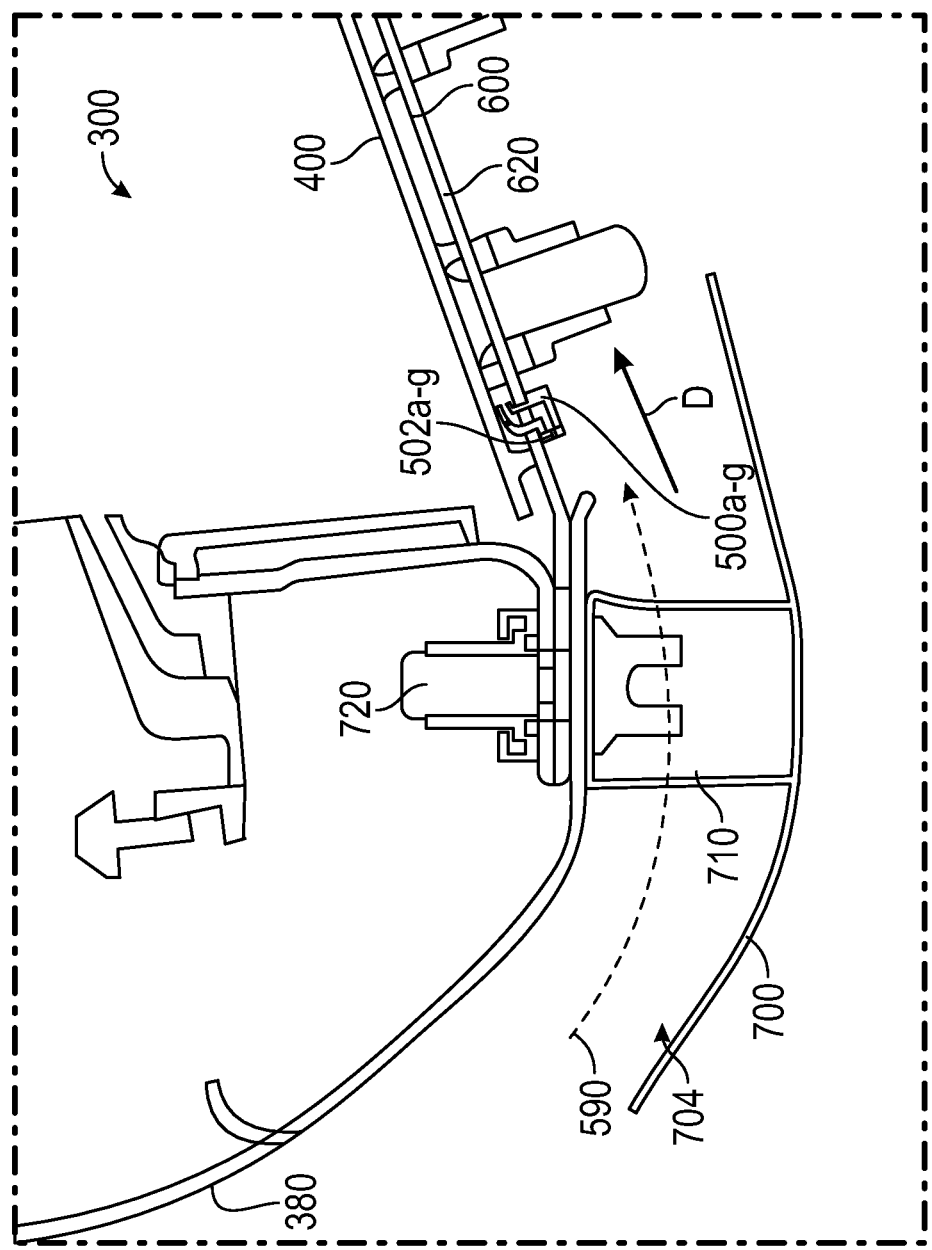
FIG. 6B is an enlarged cross-sectional illustration of the combustor of FIG. 2 having a fairing attached to the combustor, in accordance with an embodiment of the disclosure.
Figure 6C:
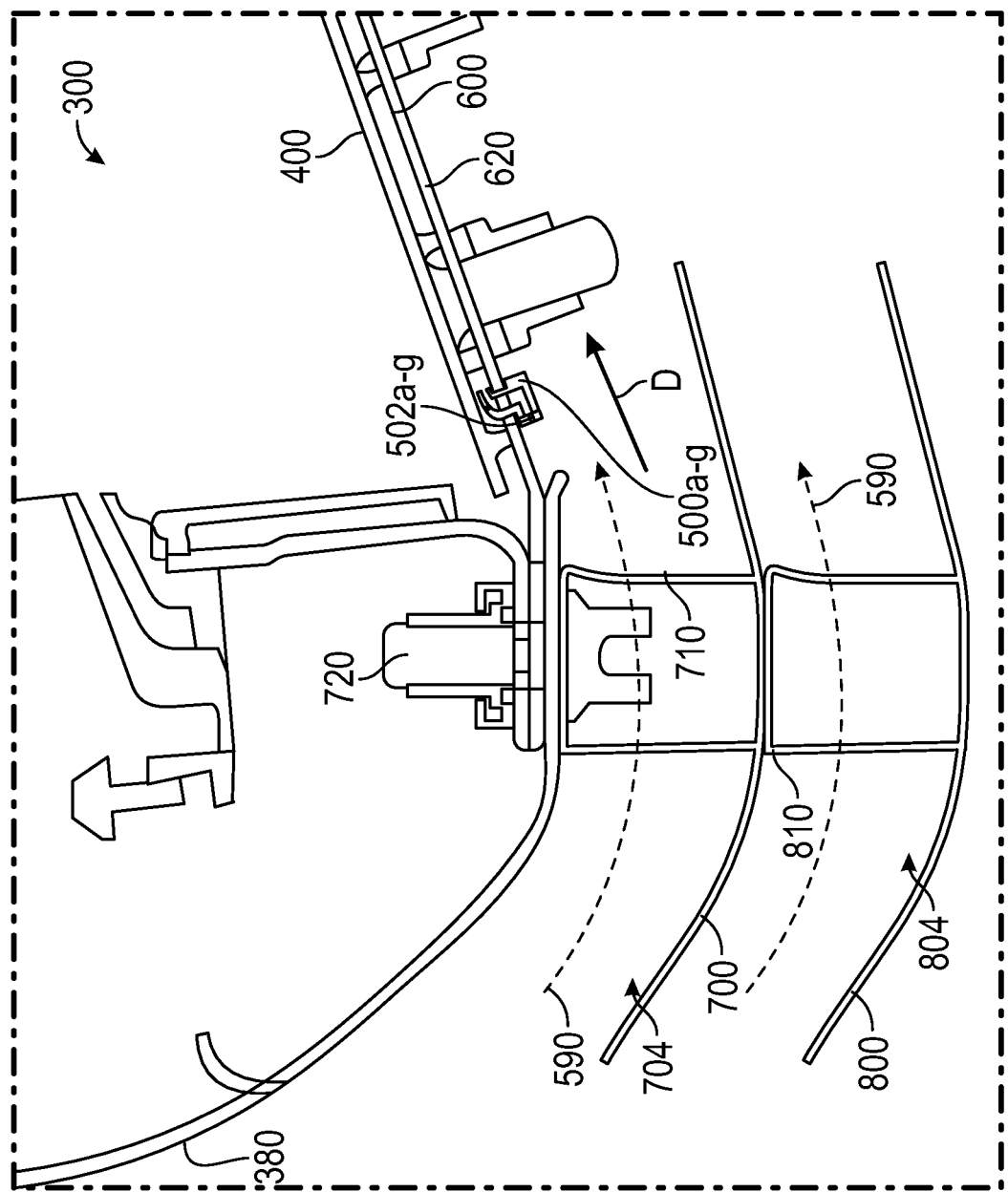
FIG. 6C is an enlarged cross-sectional illustration of the combustor of FIG. 2 having a fairing attached to the combustor, in accordance with an embodiment of the disclosure.

Referring now to FIGS. 6A-C, a first fairing 700 may be attached to the combustor 300. The first fairing 700 is configured to redirect airflow 590 in a first airflow path 704 such that the airflow 590 exits the first fairing 700 oriented parallel with the outer surface 620 of the combustion liner 600. The first fairing 700 may be operably secured to the combustor 300 through a bracket 710. The bracket 710 provides structural support for the first fairing 700 while allowing airflow 590 through the first airflow path 704. The bracket 710 may be secured to the combustor 300 by a bolt 720 of the cowl 380, as seen in FIGS. 6A-C. Alternatively, the bracket 710 may be secured to the combustor 300 at the attachment mechanism 332 that secures the heat shield panel 400 to the combustion liner 600. As shown in FIG. 6B, the first fairing 700 may be configured to redirect airflow 590 parallel to an inlet 502a-g of a lateral flow injection device 500a-g. It is understood that although the fifth configuration of the lateral flow injection device 500e is illustrated in FIGS. 6B-C, any configuration of the lateral flow injection device 500a-g may be utilized. The inlet 502a-g may be oriented parallel to the first flow path 704. As illustrated in FIG. 6C, a first fairing 700 and a second fairing 800 may be utilized. The second fairing 800 is configured to redirect airflow 590 in a second airflow path 804 such that the airflow 590 exits the second fairing 800 oriented parallel with the outer surface 620 of the combustion liner 600. The first fairing 700 is interposed between the second fairing 800 and the combustor 300, as shown in FIG. 6C. The second fairing 800 may be attached to the first fairing 700 through a bracket 810. The bracket 810 provides structural support for the second fairing 800, while allowing air flow 590 through the second airflow path 804.

Advantageously, the first fairing 700 and the second fairing 800 reduce flow separation that occurs as the airflow 590 wraps around the cowl 380. Further, the first fairing 700 and the second fairing 800 help orient airflow 590 in the airflow path D parallel to the outer surface 620 of the combustion liner 600. When airflow 590 is expanding over a 7° half-angle it has a larger adverse pressure gradient and wants to separate. The addition of a second fairing 800 helps to allow the airflow 590 to expand over a shorter distance without separation.

It is understood that a combustor of a gas turbine engine is used for illustrative purposes and the embodiments disclosed herein may be applicable to additional components of other than a combustor of a gas turbine engine, such as, for example, a first component and a second component defining a cooling channel therebetween. The first component may have cooling holes similar to the primary orifices. The cooling holes may direct air through the cooling channel to impinge upon the second component.

Technical effects of embodiments of the present disclosure include incorporating lateral flow injection device into a combustion liner to introduce lateral airflow across a heat shield panel surrounding a combustion area of a combustion chamber to help reduce collection of particulates on the heat shield panel and also help to reduce entry of the particulate into the combustion area.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine component assembly, comprising:
   a first component having an inner surface and an outer surface opposite the inner surface, wherein the first component includes a dedicated primary orifice extending from the outer surface to the inner surface through the first component;
   a second component having a first surface and a second surface, the inner surface of the first component and the second surface of the second component defining a cooling channel therebetween in fluid communication with the dedicated primary orifice for cooling the second surface of the second component; and
   a lateral flow injection device secured to the first component, the lateral flow injection device fluidly connecting an air flow path located proximate to the outer surface of the first component to the cooling channel, the lateral flow injection device being configured to direct airflow from the airflow path into the cooling channel in about a lateral direction parallel to the second surface of the second component such that a cross flow is generated in the cooling channel,
   wherein the lateral flow injection device further comprises a passageway body having a bend radius configured to direct the airflow in about the lateral direction such that the cross flow is generated in the cooling channel,
   wherein a portion of the passageway body is embedded within the dedicated primary orifice of the first component, and
   wherein the lateral flow injection device further comprises:
      a metering cap having a metering hole fluidly connecting an inlet of a passageway to the airflow path, the metering cap being attached to the passageway body, wherein the metering hole has a cross-sectional area less than a cross-sectional area of the passageway.

2. The gas turbine engine component assembly of claim 1, wherein the lateral flow injection device further comprises:
   a portion of the passageway body is located within the dedicated primary orifice.

3. The gas turbine engine component assembly of claim 2, wherein:
   the passageway is formed in the passageway body and enclosed in the passageway body.

4. The gas turbine engine component assembly of claim 1, wherein:
   the passageway body is at least one of scoop shaped and tubular shaped.

5. The gas turbine engine component assembly of claim 4, wherein:
   the passageway body and the dedicated primary orifice form the passageway.

6. The gas turbine engine component assembly of claim 1, wherein:
   the lateral flow injection device is fluidly connected to the airflow path through the inlet oriented in a direction about equal to a direction of the airflow path.

7. The gas turbine engine component assembly of claim 1, wherein:
   the lateral flow injection device is fluidly connected to the airflow path through the inlet oriented in a direction about perpendicular to a direction of the airflow path.

8. The gas turbine engine component assembly of claim 1, wherein the lateral flow injection device further comprises:
   a particulate collection location located opposite the inlet and proximate a particulate separation turn configured to turn the airflow such that a particulate separates from the airflow and is directed into the particulate collection location.

9. A combustor for use in a gas turbine engine, the combustor enclosing a combustion chamber having a combustion area, wherein the combustor comprises:
   a combustion liner having an inner surface and an outer surface opposite the inner surface, wherein the combustion liner includes a dedicated primary orifice extending from the outer surface to the inner surface through the combustion liner;
   a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the combustion liner by an impingement cavity; and
   a lateral flow injection device secured to the combustion liner, the lateral flow injection device fluidly connecting an aft flow path located proximate to the outer surface of the combustion liner to the impingement cavity, the lateral flow injection device being configured to direct airflow from the airflow path into the impingement cavity in about a lateral direction parallel to the second surface of the heat shield panel such that a cross flow is generated in the impingement cavity,
   wherein the lateral flow injection device further comprises a passageway body having a bend radius configured to direct the airflow in about the lateral direction such that the cross flow is generated in the impingement cavity,
   wherein a portion of the passageway body is embedded within the dedicated primary orifice of the combustion liner, and
   wherein the lateral flow injection device further comprises:
      a metering cap having a metering hole fluidly connecting an inlet of the passageway to the airflow path, the metering cap being attached to the passageway body, wherein the metering hole has a cross-sectional area less than a cross-sectional area of the passageway.

10. The combustor of claim 9, wherein the lateral flow injection device further comprises:
a portion of the passageway body is located within the dedicated primary orifice.

11. The combustor of claim 10, wherein:
the passageway is formed in the passageway body and enclosed in the passageway body.

12. The combustor of claim 9, wherein:
the passageway body is at least one of scoop shaped and tubular shaped.

13. The combustor of claim 12, wherein:
the passageway body and the dedicated primary orifice from the passageway.

14. The combustor of claim 9, wherein:
the lateral flow injection device is fluidly connected to the airflow path through the inlet oriented in a direction about equal to a direction of the airflow path.

15. The combustor of claim 9, wherein:
the lateral flow injection device is fluidly connected to the airflow path through the inlet oriented in a direction about perpendicular to a direction of the airflow path.

16. The combustor of claim 9, wherein the lateral flow injection device further comprises:
a particulate collection location located opposite the inlet and proximate a particulate separation turn configured to turn the airflow such that a particulate separates from the airflow and is directed into the particulate collection location.

* * * * *